Figure 8:
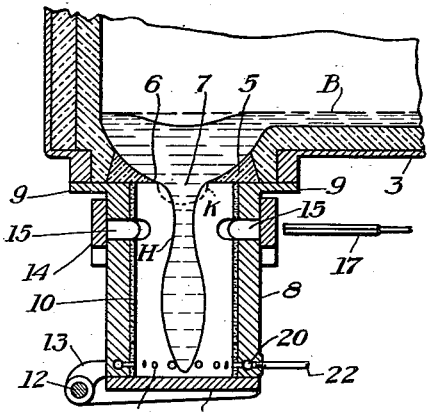

Feb. 15, 1927.  1,617,598
G. E. HOWARD
METHOD AND APPARATUS FOR FEEDING MOLTEN GLASS
Filed Feb. 17, 1922    3 Sheets-Sheet 1
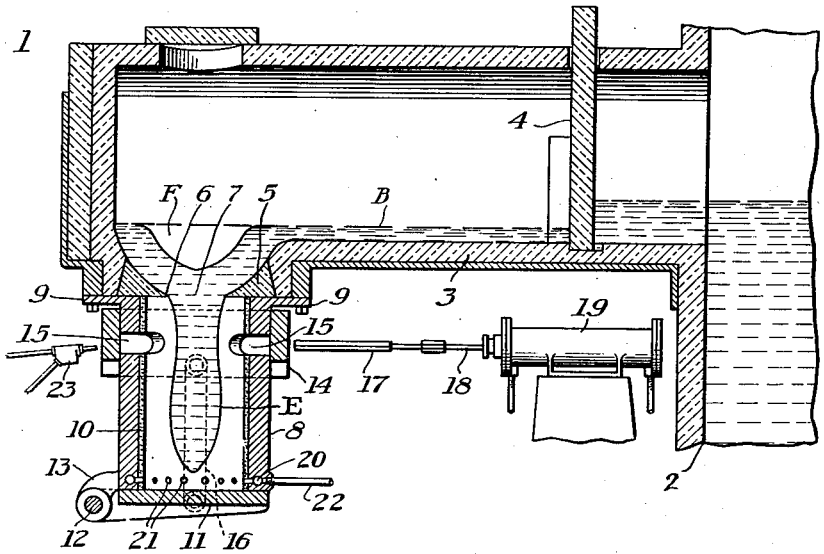
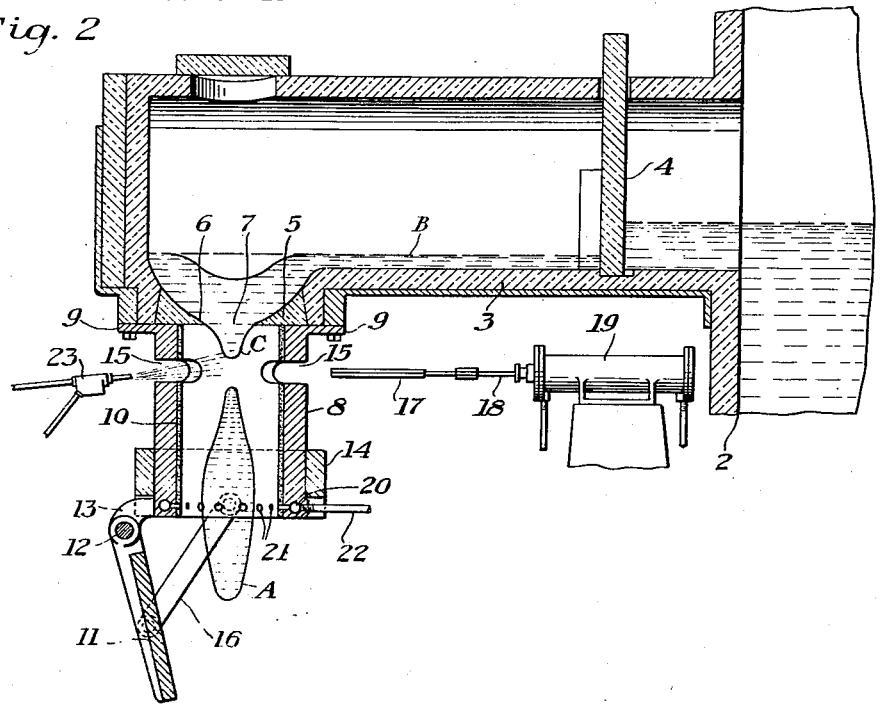
INVENTOR.
George E. Howard,
By Kay, Totten & Brown,
Attorneys

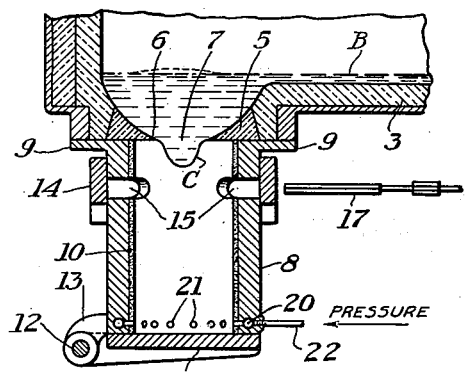
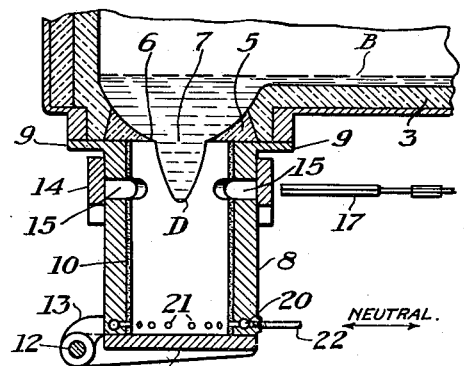
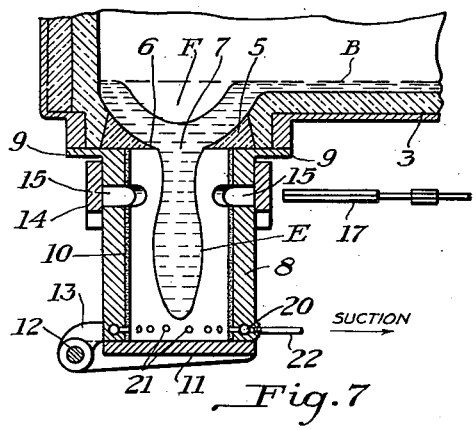
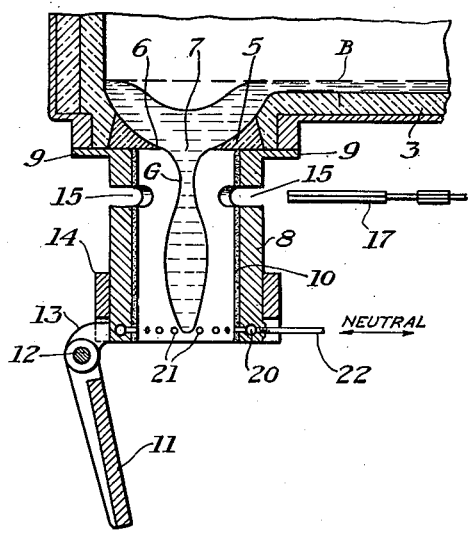
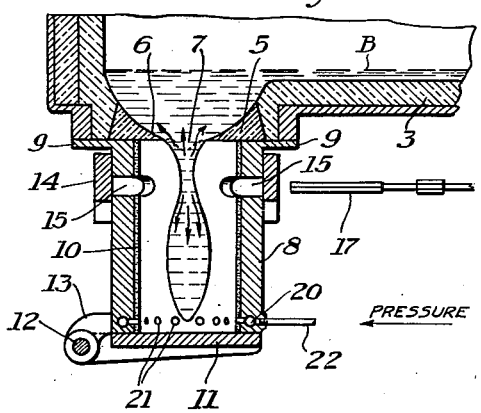

Feb. 15, 1927.  1,617,598
G. E. HOWARD
METHOD AND APPARATUS FOR FEEDING MOLTEN GLASS
Filed Feb. 17, 1922  3 Sheets-Sheet 3

INVENTOR.
George E. Howard.
By Kay, Totten & Brown,
Attorneys

Patented Feb. 15, 1927.

1,617,598

UNITED STATES PATENT OFFICE.

GEORGE E. HOWARD, OF BUTLER, PENNSYLVANIA, ASSIGNOR, BY MESNE ASSIGN-MENTS, TO HARTFORD-EMPIRE COMPANY, OF HARTFORD CONNECTICUT, A CORPORATION OF DELAWARE.

METHOD AND APPARATUS FOR FEEDING MOLTEN GLASS.

Application filed February 17, 1922. Serial No. 537,232.

My invention relates to the art of subdividing molten glass into mold charges, and its object is to provide an improved method and apparatus which shall operate in a simple and effective manner to draw the glass from a tank or other container and subdivide it into mold charges of uniform and accurately controlled weight, shape and temperature.

More specifically, the object of my invention is to provide a method and apparatus for feeding molten glass, wherein no moving parts enter the glass or the receptacle containing the glass, but in which the manipulations for shaping and subdividing the glass are all applied outside of the container and, specifically, below a downwardly opening outlet from the container.

Another object of my invention is to provide a method and apparatus for feeding molten glass, whereby the glass may be drawn from a receptacle at a rate which is regulated without the use of a valve or other solid controlling means entering the glass above the outlet.

In discharging molten glass from tanks, it is now customary to conduct the glass through a downwardly opening outlet and to act upon the glass during, or after, its flow through the outlet to change the stream into a series of masses, each of which is equal to a mold charge and is variously termed a gather, gob or drop.

One of the methods which has long been in use for feeding glass through a downwardly opening outlet is known as the stream-feeding method, and consists in permitting the glass to flow in a continuous stream through the outlet, and interposing below the outlet some device in the nature of a cup or husbanding shear, which operates to intercept the stream and accumulate a portion of the flowing glass which is transferred to a mold, followed by a portion of the flowing stream which is then cut off.

This stream-feeding method has certain disadvantages, chief of which are the shapelessness of the gather and the imperfections in the finished ware which result from the uneven temperature conditions produced when the glass is accumulated by coiling or lapping the stream in the charge-forming receptacle. For this reason, the stream-feeding method has been largely superseded by another method, commonly referred to as the gob-feeding method, wherein the flow of the stream is varied at or just below the discharge orifice, to cause the glass to issue from the orifice in a series of pulsations, the effort being to cause each pulsation or mass of glass to assume the proper size and shape for molding. Most commercial gob-feeding methods involve the use of a moving member, in the nature of a plunger, which moves vertically above the discharge outlet, and by a pump action alternately checks the flow of glass through the outlet and causes flow at a rate greater than the normal gravity flow, thus producing a pulsating stream or a series of more or less interrupted masses.

Other gob-feeding methods which have been proposed involve the use of suction and pressure produced alternately above the discharge outlet. The effect of pressure and suction applied in this manner is unsatisfactory because the suction and pressure act directly on the whole mass of glass in the forehearth or other glass receptacle. Only a slight resultant pressure or suction reaches the glass outlet, and is not sufficient to materially affect the glass issuing from the outlet. These methods are also unsatisfactory because they cause violent agitation of the glass in the forehearth and set up currents which disturb the glass and cause inertia and momentum to act unfavorably for the object to be attained, which is to produce impulse upon the pendant glass below the outlet.

Nearly all prior gob-feeding methods of which I am aware have involved the presence of mechanism of some kind within the glass receptacle, and have therefore involved a certain amount of complication as compared with the stream-feeding methods, wherein the glass is merely allowed to flow by gravity through the discharge outlet and is manipulated into mold charges after the stream is entirely free from the outlet.

According to my present invention, I provide a method of the gob-feeding type and, in addition, I obtain the advantages of the stream-feeding method as to the simplicity of the tank construction and the absence of moving mechanism within the tank. In carrying out my method, I provide a receptacle which may be the ordinary forehearth of a tank and in which the glass is preferably maintained at a low level in order to reduce the hydrostatic head at the discharge outlet. The glass is permitted to flow from the forehearth or other receptacle through a simple discharge outlet, around and below which I provide means for periodically establishing a substantially air-tight enclosure or gathering box. This box is provided with a bottom opening which is alternately closed and opened by means of a movable closure member, and one or more shear openings may be provided in the side of the box for the admission of shears which sever each gather of glass from the parent body after it is formed. I also provide means for closing the shear openings and the bottom opening, and I provide means for establishing either suction or pressure within the box.

When the glass flows through the discharge outlet the rate of flow is gradual, on account of the low head in the receptacle, and on account of the viscous nature of the glass. As the flow commences after each gather is cut off, I cover the bottom opening of the enclosure, and also the side shear openings if such openings are provided, thereby producing a substantially air-tight box below and around the discharge outlet, and at this time I preferably introduce a puff of compressed air into the enclosed box which operates to momentarily check, stop or reverse the gravity flow of glass. Then I cut off the compressed air, and permit the glass to flow by gravity for a short period. Then I place the interior of the box in communication with suction apparatus which produces sub-atmospheric pressure within the enclosure. This reduction of pressure below the discharge outlet causes the atmospheric pressure above the discharge outlet to force glass through the outlet at an increased rate, thereby maintaining the cross-section of the issuing glass and preventing the contraction or necking-in effect which would take place if the glass were permitted to flow by simple gravity. This pressure is effective only on a small area of the glass above the discharge opening.

The rapid expulsion of glass by the application of suction causes the depression of the surface of the glass immediately above the orifice, since the flow of glass toward the orifice, although sufficient to maintain the proper rate of flow per minute, is not sufficient to maintain this average rate of discharge during the relatively shorter period during which the suction is applied. Consequently, the glass is forced through the discharge opening faster than it is supplied to the discharge opening, and a depression therefore forms on the surface of the glass above the opening. If desired, a puff of air may now be applied to the interior of the box in order to assist in producing an attenuation in the issuing glass below the discharge opening and this will tend to overcome the momentum of the glass at the discharge orifice, which has been induced by the suction previously applied in the box. This application of pressure may be of sufficient intensity or duration, or both, to partially check the flow, to stop it entirely, or even to set up a reverse movement in the glass immediately within and above the discharge orifice. At the same time the glass hanging below the discharge orifice tends to fall by gravity and thus exerts a downward movement.

The suction is then cut off, and the box is opened, which restores atmospheric pressure in the box, checks the accelerated flow of glass, and produces an attenuation or necking-in of the glass at a point just below the discharge outlet. This attenuation results from the cessation of the impulse flow produced by suction in the box, and may be increased as described above by the application of pressure before the box is opened. The attenuation of the glass below the outlet may thus be made very marked. Then the shears are caused to enter the box and sever the glass, preferably at the point of attenuation. The severed mold charge of glass then falls freely from the box and may be received in a mold or other receptacle, or upon a chute which directs the gather to the mold.

Figure 11:
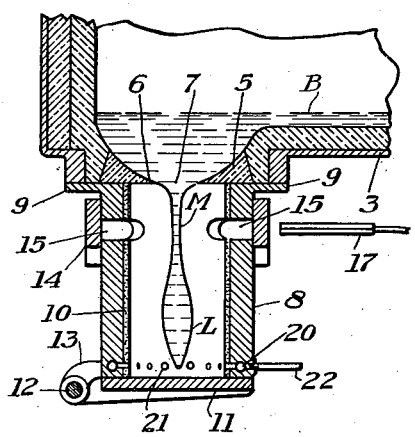
Figure 9:
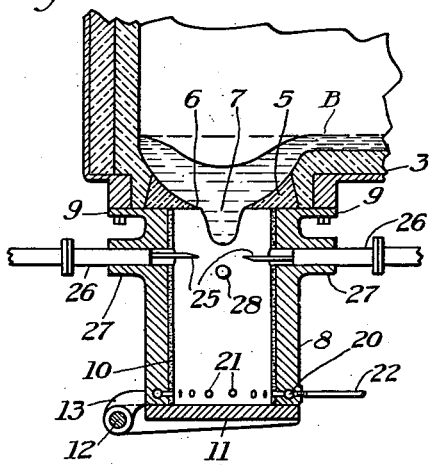
Figure 10:
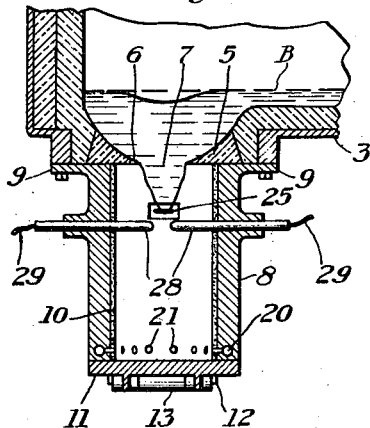

For a further understanding of my invention, reference may now be had to the accompanying drawing, in which Fig. 1 is a longitudinal vertical section through a tank forehearth of conventional construction, having my invention applied thereto, showing the position of the parts near the end of a charge-forming cycle; Fig. 2 is a vertical sectional view similar to Fig. 1, showing the position of the parts immediately after the glass is severed; Figs. 3 to 8 are diagrammatic vertical sectional views showing the successive stages in which the glass is handled; Fig. 9 is a vertical sectional view of the gathering box, showing a modified form of shear construction; Fig. 10 is another vertical sectional view of the gathering box, showing means for electrically heating the interior of the box; and Fig. 11 is another vertical sectional view showing the action of the glass if neither suction nor pressure is employed.

Referring to Figs. 1 and 2 of the drawings, the numeral 2 indicates the refining end of a glass tank having an extension or forehearth 3 provided with a gate 4 for controlling the delivery of glass to the forehearth and with a flow bushing 5. The upper sides of the flow bushing 5 may converge at a sharp angle with the bottom of the bushing, as shown at 6, instead of terminating at an opening with vertical walls as in ordinary flow bushings.

Below and around the outlet openings 7 in the bushing 5 is secured an annular metal box 8 which may be provided with flanges 9 for attachment to the underside of the forehearth. The box 8 may be of circular or other desired cross-section, and may be lined with heat-insulating material, as shown at 10, in order to reduce the radiation of heat. A bottom closure member 11 of proper size and shape to fit against and close the bottom opening of the box 8 is pivoted at 12 to a bracket 13 near the bottom of the member 8. A sleeve 14 fits slidably around the outside of the box 8 and, when in the upper position shown in Fig. 1, closes one or more shear openings 15 formed in the side of the box 8 a short distance below the glass outlet 7. Links 16 are pivotally connected at their upper and lower ends to the sleeve 14 and to the bottom closure member 11 to cause the sleeve and bottom closure member to move together from the closed position shown in Fig. 1 to the open position shown in Fig. 2.

Shears 17, which may be of any ordinary or desired construction, are arranged to enter the box 8 through one or more of the openings 15, and, as shown, are of the well-known type in which two shear blades are carried by an arm 18 operated by a fluid pressure cylinder 19 to advance quickly, to cut the glass, and then to withdraw quickly. If desired, the shears may be of the other well known type consisting of two oppositely-moving shear blades which, in that case, enter the box 8 through the opposite openings 15. The vertical position of the shears 17 and of the side openings 15 may be varied to suit particular requirements. In general, I prefer to locate the shears fairly close to the outlet 7.

Near the bottom of the box 8 I provide an annular channel 20 which communicates with the interior of the box through a series of small openings 21. The channel 20 is connected by means of a pipe 22 with suitable sources of adjustable suction and pressure for producing super-atmospheric pressure or sub-atmospheric pressure within the box 8. Since these suction and pressure arrangements are well known in the art, it is not deemed necessary to illustrate them in detail. Neither is it considered necessary to illustrate the precise mechanical movements by which the bottom closure 11 and the sleeve 14 are alternately raised and lowered, it being evident that this movement may be accomplished in a variety of ways.

If desired, a flame may be introduced through one of the openings 15 in order to increase the temperature within the gathering box, and I have shown on the drawing a burner 23 which directs its flame through the opening 15 opposite to the opening through which the shears 17 enter the gathering box. However, the radiation of heat from the descending gathers quickly heats up the interior of the box to a temperature not materially less than the temperature of the glass, especially when the box is lined with the heat insulation 10. Therefore the burner 23 is not always required, and it may even be desirable to introduce cooling air instead of a heating flame through the opening 15, as when the temperature of the glass in the tank is allowed to become too high for proper working.

By keeping the interior of the gathering box at a high temperature I facilitate the reheating of the shear scar which is produced at the point where the shears sever each gather of glass. While, for this reason, it is desirable to keep the interior of the box at a temperature equal to or greater than the temperature of the issuing glass, it may be found desirable to artificially cool the outer wall of the box in order to prevent the sliding sleeve 14 from sticking. Such cooling means may consist of channels through which cooling water may be circulated, or water may be directed upon the outer surface of the gathering box.

Figure 9 shows a modified arrangement of the shears which may be employed when it is not desired to uncover the side openings 15. As shown in Fig. 9 the shears consist of two blades 25 which meet at a point below the center of the glass outlet 7 and which are carried in slides 26 which fit slidably within bearings 27 formed in the side walls of the box 8. These shears may be reciprocated by compressed air cylinders or by other well known means, and may be provided with cooling means which, however, are not shown on the drawings since the cooling of shears is well known in the art.

Figs. 9 and 10 also show a modified form of device in which the interior of the box 8 may be heated electrically. Below the shears 25, and preferably arranged at right angles to the shear openings, are two other openings in the side walls of the box 8 in which electrodes 28 are slidably mounted. These electrodes are connected by means of conductor wires 29 to a suitable source of arc-producing electric current, not shown, and the electrodes may be brought together and separated just after the shears operate to sever each mold charge of glass, thereby producing an arc adjacent to the severed stub of glass, which effectively reheats the shear scar and also contributes to maintain the interior of the box at a high temperature.

The sequence of operations may be best understood by first considering Fig. 2, which shows the condition of the apparatus immediately after the mold charge A has been cut off, and then referring in turn to Figs. 3 to 8. In Fig. 2 the mold charge A is falling from the gathering box, the shears 17 are retracted, and the bottom closure 11 and the sleeve 14 are in their lowest positions. Atmospheric pressure is therefore present in the gathering box as well as above the glass outlet and the glass issues, as shown at C, under simple atmospheric pressure. Before much glass has had time to flow through the outlet the closure member 11 and the sleeve 14 are raised to close the box, as shown in Fig. 3, and a puff of compressed air may be introduced through the pipe 22, the channel 20 and the openings 21, thereby increasing the pressure in the box and temporarily checking the gravity flow of glass at C. This insures that the glass above the outlet 7 will rise to the normal level and may even accumulate a slight excess of glass above the normal level over the outlet, as shown in dotted lines at B', Fig. 3.

If the compressed air has been applied it is then cut off and the glass is allowed to flow by gravity for a short time, as shown at D, Fig. 4, the rate of this gravity flow being controlled by the degree of pressure which has been set up within the gathering box. Before the issuing glass descends far enough to pull away from the outlet and break into a stream, the pipe 22 is placed in communication with the suction means which quickly reduces the pressure in the gathering box below atmospheric pressure. When this occurs the atmospheric pressure above the outlet quickly forces glass through the outlet at an increased rate over the normal gravity flow, this increased flow being sufficient to keep the cross section of the glass substantially constant, as shown at E in Figs. 1 and 5. The sudden discharge of glass causes a depression of the glass level above the discharge outlet, as shown at F, Figs. 1 and 5. When the glass has been expelled to the required length, the box is quickly opened by moving the bottom closure 11 and the side sleeve 14 down to the positions shown in Fig. 2, whereupon the glass attenuates opposite to the shear 17 in the manner described above, and as shown at G, Fig. 6. The shears then advance and cut off the mold charge which falls freely, as shown at A in Fig. 2, and is received in a mold or upon a chute according to the usual practice.

The gathering box must of course be long enough to permit the gather to hang freely up to the time when the bottom of the box is opened. The attenuating effect may be increased, if desired, by forcing compressed air into the gathering box just after the suction is cut off, and before severance, and then opening the box to atmospheric pressure. This produces an effect on the glass which is indicated in Fig. 7. The flow of glass through the outlet 7 is either checked or stopped, or is even reversed. During this time glass flows into the cup above the outlet 7 faster than it is flowing through the outlet, and this additional flow partially or wholly restores the normal level above the glass outlet.

Fig. 7 represents the extreme case where the pressure applied just before severance is sufficient to reverse the movement of the glass particles above the line of severance, while the weight of the hanging mass is pulling the glass particles below the line of severance in the opposite direction. The direction of movement of the glass particles at this time is indicated by the arrows on Fig. 7. In this case the attenuation or necking-in effect is very pronounced and the momentum of the glass in the orifice and above it tends to increase the lifting of the severed stub from the shears.

This method of gob delivery can also be operated without the use of any pressure, in which case the control of the shape of the gather is less effective than where one or both of the pressure applications is made, since the attenuating effect at the time of severance is greatly reduced, and therefore it is more difficult for the shears to make a clean cut. Fig. 8 shows the action of the glass at the time of shearing, when no pressure is applied just previous to severance. The glass is attentuated at H, the shears sever the glass at the point of attenuation, and the natural tendency of the end of a liquid stream issuing by gravity from an outlet to approach a spherical form will produce a contour somewhat of the form shown in dotted lines at K, Fig. 8. This tends to lift the glass from the shears, or at least minimizes its tendency to build up on the shears during severing, and thereby reduces the chilling effect of the shears.

Between the limits indicated in Figs. 7 and 8 the suction and pressure action can be modified in any degree desired.

Fig. 11 shows the manner in which the glass would flow through the outlet 7 if neither suction, pressure or other force is employed to modify the gravity flow. A lump L forms first, and is followed by a tail M which thins out to a very small stream which continues to flow continuously as long as glass is supplied to the outlet 7. This figure is shown in contrast to the shaped and compact gathers shown in the preceding figures.

By controlling the amount of suction and pressure, and the time during which these are applied, a considerable variation in the shape and weight of the glass gathers may be produced.

It will be observed that this invention produces glass mold charges of substantially uniform, controllable shape and of regulated weight and uniform temperature, without the use of valves or other moving parts in the glass.

It is recognized that various forms of apparatus are suitable for carrying out this invention, and therefore no limitations are to be imposed on the invention except such as are indicated in the appended claims.

I claim as my invention:

1. The method of feeding molten glass that comprises bringing the glass above a downwardly opening outlet, and forming freely-hanging gathers of glass below said outlet by alternate application of downward suction and upward pressure below said outlet.

2. The method of feeding molten glass that comprises bringing the glass above a downwardly opening outlet, producing super-atmospheric pressure below said outlet to check the flow of said glass therethrough, and thereafter producing sub-atmospheric pressure below said outlet to increase the flow of glass therethrough.

3. The method of feeding molten glass that comprises bringing the glass above a downwardly opening outlet, producing super-atmospheric pressure below said outlet to check the flow of glass therethrough, then permitting the glass to flow through said outlet, then producing sub-atmospheric pressure below said outlet to increase the flow of glass therethrough while maintaining the glass below said outlet in a freely-hanging condition, and severing the glass below said outlet while still hanging freely.

4. The method of feeding molten glass that comprises bringing the glass above a downwardly opening outlet, producing super-atmospheric pressure below said outlet to check the flow of glass therethrough, thereafter producing sub-atmospheric pressure below said outlet to increase the flow of glass therethrough, again producing super-atmospheric pressure below said outlet to again check the flow of glass through said outlet, and severing the glass below said outlet while still hanging freely.

5. The method of feeding molten glass that comprises bringing the glass above a downwardly opening outlet, producing super-atmospheric pressure below said outlet to check the flow of glass therethrough, thereafter producing sub-atmospheric pressure below said outlet to increase the flow of glass therethrough, again producing super-atmospheric pressure below said outlet sufficient to stop the flow of glass through said outlet, and severing the glass below said outlet while still hanging freely.

6. The method of feeding molten glass that comprises bringing the glass above a downwardly opening outlet, producing super-atmospheric pressure below said outlet to check the flow of glass therethrough, thereafter producing sub-atmospheric pressure below said outlet to increase the flow of glass therethrough, again producing super-atmospheric pressure below said outlet sufficient to reverse the flow of glass through said outlet, and severing the glass below said outlet while still hanging freely.

7. The method of feeding molten glass that comprises flowing the glass by gravity from a receptacle through an opening into an enclosed space larger in diameter than the diameter of said opening, and thereafter producing sub-atmospheric pressure in the said space, thereby increasing the rate of flow of glass through said opening, and producing a freely-hanging mass of glass below said opening.

8. The method of feeding molten glass that comprises flowing the glass by gravity from a receptacle through an opening into an enclosed space larger in diameter than the diameter of said opening, thereafter producing sub-atmospheric pressure in the said space, thereby increasing the rate of flow of glass through said opening and producing a freely-hanging mass of glass below said opening, severing the glass while still hanging freely, and discharging the resulting gather of glass into a mold or other receptacle.

9. The method of feeding molten glass that comprises flowing the glass by gravity from a receptacle downwardly through an opening into an enclosed space larger in diameter than said opening, thereafter producing sub-atmospheric pressure in the said space, thereby increasing the rate of flow of glass through said opening and producing a freely-hanging mass of glass below said opening, severing the glass while still hanging freely at a point spaced below said opening, and discharging the resulting gather of glass into a mold or other receptacle.

10. The method of feeding molten glass that comprises flowing the glass from a receptacle downwardly through an opening into an enclosed space, producing sub-atmospheric pressure in the said space, thereby increasing the rate of flow of glass through said opening, severing the glass while hanging freely at a point spaced below said opening, and permitting the resulting gather of glass to fall freely into a mold or other receptacle.

11. The method of feeding molten glass that comprises flowing the glass from a receptacle through an opening into an enclosed space, producing super-atmospheric pressure in the said space, thereby decreasing the rate of flow of glass through said opening, and thereafter producing sub-atmospheric pressure in the said space, thereby increasing the rate of flow of glass through said opening.

12. The method of feeding molten glass that comprises flowing the glass from a receptacle through an opening into an enclosed space, producing super-atmospheric pressure in the said space, thereby decreasing the rate of flow of glass through said opening, thereafter producing sub-atmospheric pressure in the said space, thereby increasing the rate of flow of glass through said opening, severing the glass, and then discharging the resulting gather of glass into a mold or other receptacle.

13. The method of feeding molten glass that comprises flowing the glass in a pendant mass from a receptacle downwardly through an opening into an enclosed space, producing super-atmospheric pressure in said space, thereby decreasing the rate of flow of glass through said opening, thereafter producing sub-atmospheric pressure in the said space, thereby increasing the rate of flow of glass through said opening, then providing an opening below the pendant glass and severing the glass, thereby permitting the resulting gather of glass to fall freely.

14. The method of feeding molten glass that comprises flowing the glass in a pendant mass from a receptacle downwardly through an opening into an enclosed space, producing super-atmospheric pressure in said space, thereby decreasing the rate of flow through said opening, thereafter producing sub-atmospheric pressure in said space and thereby increasing said flow of glass through said opening, then again producing super-atmospheric pressure below said space to again decrease the rate of flow of glass through said opening, then providing an opening below the pendant glass, and severing the glass, thereby permitting the resulting gather of glass to fall freely.

15. The method of feeding molten glass that comprises passing the glass through a discharge outlet, severing the glass below the said outlet, and establishing an electric arc adjacent to the point of severance, thereby reheating the stub of glass remaining after severance.

16. The method of feeding molten glass that comprises passing the glass through an outlet, periodically severing the glass below said outlet, and establishing an electric arc adjacent to the stub of glass remaining after each severing operation, thereby reheating the chilled glass remaining after severance.

17. The method of feeding molten glass that comprises flowing the glass from a receptacle downwardly through an opening into an enclosed space, introducing a puff of compressed air into the said space, thereby decreasing the rate of flow of said glass through said opening, then permitting the glass to flow through the said opening by gravity for a period of time, then producing sub-atmospheric pressure in the said space, thereby increasing the rate of flow of said glass through said opening, then providing an opening below the pendant glass and severing the glass, thereby permitting a resulting gather of glass to fall freely.

18. Apparatus for feeding molten glass comprising a receptacle having a discharge outlet, an annular member secured below said outlet and having a bottom opening, and also having an opening in the side wall for the admission of shears, said shear opening being wholly spaced below the upper end of said member means for closing the said bottom opening and said shear opening, and means for establishing abnormal air pressures within the said member.

19. Apparatus for feeding molten glass comprising a receptacle having a discharge outlet, an annular member secured below said outlet and having a bottom opening, and also having a plurality of openings in its side wall for the admission of shears, said shear opening being wholly spaced below the upper end of said member means for closing said bottom opening and said shear openings, and means for establishing abnormal air pressures within said member.

20. Apparatus for feeding molten glass comprising a receptacle having a discharge outlet, an annular member secured beneath and around said outlet, means for producing sub-atmospheric pressure within said member and for thereby regulating the flow of glass through said outlet, and heat-insulation for reducing the escape of heat from said member.

21. Apparatus for feeding molten glass comprising a receptacle having a discharge outlet, an annular member secured beneath and around said outlet and having a bottom opening, means for closing said bottom opening, and means for introducing shears into the interior of said annular member without admitting air through the shear openings.

22. Apparatus for feeding molten glass comprising a receptacle having a discharge outlet, an annular member secured beneath and around said outlet and having a bottom opening, means for closing said bottom opening, bearings formed in the side of said annular member, slides received in said bearings, and shears carried by said slides.

23. Apparatus for feeding molten glass comprising a receptacle having a discharge outlet, means for causing glass to issue from said outlet in a succession of mold charges, means for severing said mold charges, and means for producing an electric arc adjacent to the stub of glass remaining after severance and for thereby reheating said stub.

24. Apparatus for feeding molten glass comprising a receptacle having a discharge outlet, an annular member secured beneath and around said outlet, means associated with said annular member for regulating the flow of glass through said outlet, and arc-forming electrodes extending into said annular member and adapted to produce electric arcs therein.

25. The method of feeding molten glass that comprises flowing the glass downwardly through an outlet into a receptacle, then closing said receptacle, and thereafter producing sub-atmospheric pressure within said receptacle.

26. The method of feeding molten glass that comprises flowing the glass downwardly through an outlet into a receptacle, then closing said receptacle, and thereafter retarding the flow of glass into said receptacle by producing super-atmospheric pressure within said receptacle.

27. The method of feeding molten glass that comprises flowing the glass in a shallow layer into a shallow well having an outlet in its bottom and forming the glass issuing from said outlet into a succession of mold charges by alternately applying super-atmospheric pressure and sub-atmospheric pressure below said outlet.

28. The method of feeding molten glass that comprises flowing the glass into a shallow well having an outlet in its bottom, controlling the flow of glass into said well to produce a shallow head of glass over said outlet, flowing the glass through said outlet into an enclosure and producing abnormal pressure in said enclosure to form the issuing glass into a succession of suspended mold charges and severing such mold charges while in suspension.

29. Apparatus for feeding molted glass comprising a receptacle having a discharge outlet and an annular closure member secured below said outlet, said annular member having opposed openings formed in its side walls, and shears adapted to approach each other through said openings to sever said issuing glass.

30. Apparatus for feeding molten glass comprising a receptacle having a discharge outlet and an annular closure member secured below said outlet, said annular member having opposed openings formed in its side walls, said openings consisting of horizontal slots spaced below the top of said annular member, and shears adapted to approach each other through said openings to sever the issuing glass.

31. Apparatus for feeding molten glass comprising a receptacle having a discharge outlet, an annular closure member secured below said outlet, and a bottom closure for said annular member mounted to swing on a horizontal pivot.

32. Apparatus for feeding molten glass comprising a receptacle having a discharge outlet, an annular closure member secured below said outlet, and a swinging bottom closure for said annular member, said closure being mounted to swing on a horizontal pivot disposed at one side of said annular member.

33. Apparatus for feeding molten glass comprising a receptacle having a downwardly opening discharge outlet, an annular member secured beneath said outlet, and means for producing abnormal pressure within said member, said means comprising an annular channel near the lower end of said lower member, ports opening from said annular channel to the space within said member, and means for connecting said channel to a source of abnormal pressure.

34. Apparatus for feeding molten glass comprising a receptacle having a downwardly opening discharge outlet, an annular member secured beneath said outlet, and means for producing abnormal pressure within said member, said means comprising an annular channel near the lower end of said annular member, ports opening from said annular channel into the space within said member, said ports being symmetrically spaced around said annular member, and means for connecting said channel to a source of abnormal pressure.

In testimony whereof, I the said GEORGE E. HOWARD have hereunto set my hand.

GEORGE E. HOWARD.